Feb. 13, 1945. R. H. HART 2,369,458
PARACHUTE APPARATUS
Filed April 3, 1942
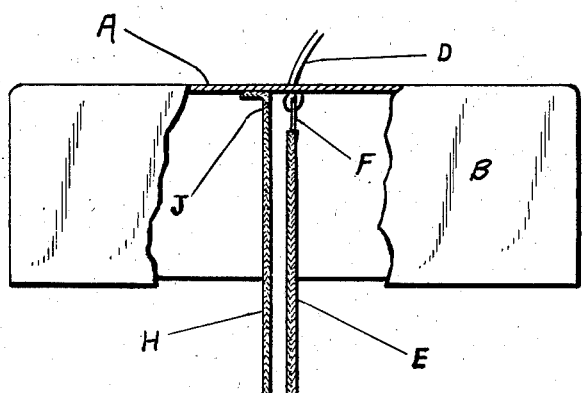
Fig. 1
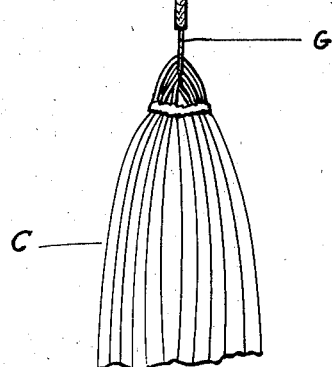
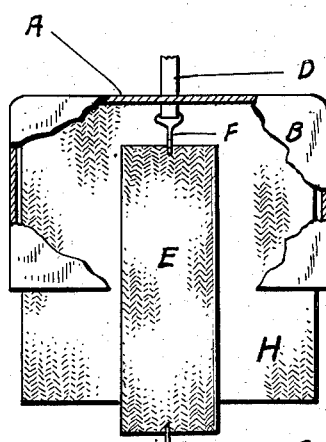
Fig. 2
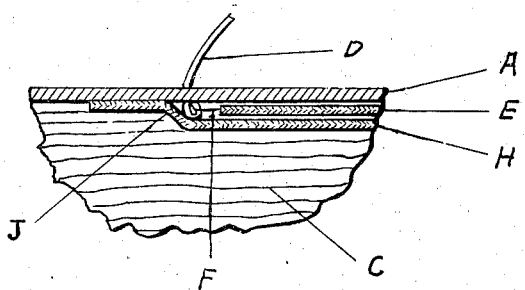
Fig. 3
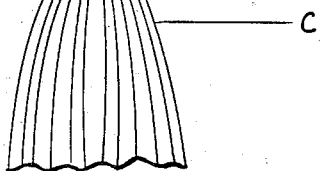
Richard H. Hart
INVENTOR.

Patented Feb. 13, 1945

2,369,458

UNITED STATES PATENT OFFICE 2,369,458

PARACHUTE APPARATUS

Richard H. Hart, New Orleans, La.

Application April 3, 1942, Serial No. 437,571

4 Claims. (Cl. 244—149)

My invention relates to improvements in parachute containers and parachute launching devices, and consists in the combinations, constructions, and arrangements hereinafter described and claimed.

The parachute container or pack in general use for premeditated mass jumps in certain countries is responsible for definite operative faults, and it is the purpose of this invention to provide a container or pack which shall not give rise to such faults.

The parachute pack in question is equipped with a static line, this static line being usually a length of webbing, one end of which is attached to the aircraft from which the jumps are made, the other end being attached to the cover of the parachute pack and also to the apex of the parachute canopy enclosed therein. When a jump is executed, the static line is extended to its full length, whereupon it performs its primary function of pulling the pack cover from the parachute pack, and its secondary function of extending the parachute canopy for ready inflation. The canopy is attached to the static line or to the pack cover, or to both, by a breakable cord, this cord being broken by the weight of the jumper after the canopy has reached its fullest extension, and the canopy is thus finally freed from connection with the pack cover.

It is this breakable cord which gives rise to the operative faults referred to above, as shall be shown. One consequence of the pulling of the pack cover from the pack and the canopy contained therein is the creation of a partial vacuum between the pack and the pack cover. As a resultant of this partial vacuum there is a tendency for the canopy to be pressed against the base of the container during the drawing apart of the pack and the pack cover, and the canopy's extension thereby prevented. The inertia or momentum of the canopy also contributes, although in lesser degree, to the same tendency. It has thus been found necessary to employ for the breakable cord referred to very strong material (one-hundred-pound-test), in order that it shall not be prematurely broken and the desired extension of the canopy thereby prevented. However, since the canopy possesses the quality of elasticity, it is elongated or stretched to a considerable degree before the strain on the breakable cord has been increased to the breaking-point. Upon the parting of the breakable cord, therefore, there is a natural tendency of the canopy to rebound toward the point of its attachment to the wearer, with the too-frequent result that the fabric of the canopy, or a portion of it, passes between one or more suspension-lines and the wearer, causing such phenomena as "double openings" and "inside-out openings," and sometimes entirely preventing inflation of the canopy. Since such operative faults are likely to result in disability or death for the wearer, their elimination is of course highly desirable.

Inasmuch as it is the high breaking-strength of the breakable cord which causes the undue stretching of the canopy and the resulting rebound thereof with its frequently disastrous consequences, it can be seen that the provision of some dependable means, by which a breakable cord of greatly reduced strength shall be made to perform the function of the strong cord presently employed, will overcome the operative faults engendered by the use of the presently used cord. It is the specific object of this invention to provide such means, the provision thereof being accomplished as hereinafter described and illustrated.

Since it is not found practicable to eliminate the partial vacuum, already referred to as being created by the sudden drawing apart of the pack and the pack cover, petitioner has devised means by which this very phenomenon may be employed to prevent or greatly reduce the previously resulting strain upon the breakable cord during the life of such partial vacuum. This is accomplished by the insertion between the canopy and the breakable cord of a link of suitable material, and by the provision of a properly constructed shield which shall cooperate with said link in relieving the breakable cord of the excessive strain given rise to by the partial vacuum during its existence.

The above-mentioned link alone, without the cooperation of the shield also referred to, may, when constructed properly and inserted between the canopy and the pack cover, be made to serve the same purpose to a limited degree.

A form of my invention is illustrated in the accompanying drawing forming a part of this application, in which Figure 1 is an elevational cut-away view from one side of the parachute pack cover with the canopy unpacked;

Figure 2 is an elevational cut-away view from one end of the parachute pack cover with the canopy unpacked;

Figure 3 is an enlarged sectional detail view from the same side of the parachute pack as Figure 1, showing relative positions of operating parts and parachute canopy when packed.

In these figures, the letter A indicates the top of the parachute pack cover; B, the flexible material forming the sides and ends of the cover; C, the parachute canopy; D, the static line; E, the link which is a principal feature of this invention; F, the breakable cord; G, non-breaking means for attaching the link to the canopy; H, the shield which is another principal feature of this invention; J, the hinge or flexible portion of shield.

The parachute pack cover with which the improvements described herein are especially intended to be used has a static line attached to its top, and has sides of flexible material, the lower edges of these sides being stitched to the base of the pack with breakable thread or otherwise releasably attached thereto.

Referring more particularly to the drawing, it will be noted that the link E—which is attached at its upper extremity by the breakable cord F to the top A of the pack cover, or to the static line D or to both at once, and at its lower extremity by the non-breaking means G to the apex of the canopy C—may conveniently have the form of a sheet of flexure-resistant material of such width and length that it will lie closely against the top of the container when the parachute is packed, as seen in Figure 3. The shield H also of flexure-resistant material, is attached near its upper edge by hinge means J to the top of the pack cover at a convenient distance from the point of attachment of the breakable cord, and is of such size and shape and so arranged that, when the parachute is packed, it will lie closely against the link, which in turn lies closely against the top of the pack cover, as seen in Figure 3, with its side edges in juxtaposition to the flexible sides B of the pack cover, and its lower edge lying in close proximity to the lower edge of the link. It is also desirable that these lower edges lie in juxtaposition to the end of the pack cover, in order to prevent lateral movement of the link during the period of strain previously referred to.

It is of course not important to this invention whether the link and shield described above be of material naturally stiff, or whether they be of flexible material rendered flexure-resistant by the attachment thereto or incorporation therein of stiffening material or materials.

Should it be desired to use the link alone, without the shield, said link should have a different form from that just described. Instead of having the form of a sheet of flexure-resistant material attached at its upper extremity by the breakable cord to the top of the pack cover, it may have the form of a strip or length of any strong material, attached at its upper extremity to the top of the pack cover by non-breaking means, and having its lower extremity attached to the canopy by means of the breakable cord, and said length of material being of such longitude that its extension shall require an interval of time not shorter than the duration of the partial vacuum and inrush of air previously referred to. The simplest application of this form would be the continuation through the pack cover (to which it is firmly attached) of the static line, with the lower extremity of this continuation attached to the canopy by means of the breakable cord. However, the most infallible manner of using the link without the shield is its employment in the form of a length of flexible material, of such longitude that its extension shall require an interval of time not shorter than the duration of the partial vacuum and inrush of air, said length of material having its lower extremity attached to the canopy by non-breaking means, and having its upper extremity attached to the pack cover or to the static line, or to both, by means of the breakable cord, the body of such link or length of flexible material being releasably attached to the pack cover or to the static line, or to both, by a paying-out device, so arranged that no strain may be put on the breakable cord until the link has been completely paid out. This paying-out device may have any of the well-known forms of such contrivances, including that presently used for paying-out the static line upon the exterior of the pack.

Coming now to the operation and use of the parachute container embodying the invention hereinabove described, we may first consider the form initially outlined, which makes use of a link of flexure-resistant material and a shield also of flexure-resistant material. Assuming that the parachute has been packed as shown in Figure 3, it is adjusted upon the wearer, and the static line fastened to the aircraft by the usual method. When the wearer jumps from the aircraft, the static line is extended to its full length, whereupon the weight of the wearer causes it to pull the pack cover suddenly from the pack. This sudden pulling apart of the pack and the pack cover results in the momentary formation of a partial vacuum between the two, followed by an inrush of air to fill such partial vacuum. This inrush of air presses the canopy against the base of the pack and causes the canopy to strongly resist the effort being exerted by the static line and its connections to disengage the canopy from the base of the pack. It is at this point in the operation that a weak breakable cord, attached in the ordinary manner, would give way. However, in the container embodying the first-described form of this invention, the same inrush of air which presses the canopy against the base of the pack also presses the flexible sides of the pack cover inward, causing them to grip the edges of the flexure-resistant shield to which they have been in juxtaposition, and to hold said shield firmly in place. Since the shield is being held in the horizontal position shown in Figure 3, the link also must be retained in position against the top of the pack cover, and since in this position it may move neither vertically nor horizontally no strain may be put upon the breakable cord so long as the partial vacuum and inrush of air endure. With the cessation of the inrush of air, both shield and link will drop to a vertical position, and the breakable cord will assume its part in the operation of extending the canopy; but, since the canopy is no longer being pressed against the base of the pack as had been true a moment before, no great expenditure of effort is required for its extension, and no great strain is put upon the breakable cord until the canopy is fully extended. It will therefore be apparent that a breakable cord of much less strength (say, fifty-pound-test) will perform the necessary function. And since such a cord can cause much less elongation or stretching of the canopy before parting than the hundred-pound-test cord heretofore employed, there will ensue insufficient rebound of the canopy to permit its passage between the suspension lines, and the consequent imperiling of the wearer's life and limbs.

As to the operation of the parachute container embodying either of the alternative forms of this invention, in which a strip or length of any strong material is employed as a link between the canopy and the pack cover, without a cooperating shield, it will be readily seen that such inserted link operates to delay the exertion of strain upon the breakable cord until after the cessation of the partial vacuum and the inrush of air resulting therefrom. While these alternative forms, also, will permit employment of a relatively weak breakable cord, there may be some objection raised to them on the ground of possible entanglement with the canopy, an objection which may be overcome by the use of a shield similar to that previously described, but not necessarily of flexure-resistant material, since its function is merely to prevent any such entanglement.

In conclusion, it may be well to point out that the correction of the operative faults herein discussed is especially to be desired in the case of paratroops, who under service conditions may be required to jump at low altitudes and without reserve parachutes, so that the proportion of effectives safely landed may be in direct ratio to the efficiency of their parachute equipment.

I claim:

1. A parachute pack cover covering a packed parachute, a static line attached to said cover and adapted to draw said cover from said packed parachute, suitable connecting means attaching said cover to said parachute, said connecting means functioning to pull out said parachute to its greatest normal length when cover is drawn away by means of said static line, and said connecting means including a breakable member, said breakable member being adapted to be broken when said parachute has been pulled out to its greatest normal length, thereby freeing the parachute from the cover, and said cover and connecting means having preventing means operating automatically to prevent breaking of the breakable member before the parachute shall be pulled out to its greatest normal length.

2. A parachute pack cover covering a packed parachute, a static line attached to said cover and adapted to draw said cover from said packed parachute, said cover having sides of flexible material, suitable connecting means attaching said cover to said parachute, said connecting means functioning to pull out said parachute to its greatest normal length when cover is drawn away by means of said static line, the connecting means consisting in a breakable member attached to the static line, and of a link of flexure-resistant material attached at its upper extremity to the breakable member, and at its lower extremity by non-breaking means to the contained parachute, said link being of such size and shape and so arranged that when the parachute is packed the link may lie closely against the cover, with its lower extremity in juxtaposition to the end of the cover, and a shield of flexure-resistant material attached to said cover, said shield being of such size and shape and so attached to the cover that when the parachute is packed the shield may lie closely against the above described link, with its lower extremity in juxtaposition to the end of the cover, and its side edges in juxtaposition to the flexible sides of the cover, said shield being flexibly attached to the cover, to the end that when said cover has been pulled away from the packed parachute said shield shall be free to swing away from the position in which it lies when the parachute is packed.

3. A parachute pack cover covering a packed parachute, a static line attached to said cover and adapted to draw said cover from said packed parachute, suitable connecting means attaching said cover to said parachute, said connecting means functioning to pull out said parachute to its greatest normal length when cover is drawn away by means of said static line, connecting means including a breakable member adapted to be broken when parachute has been pulled out to its greatest normal length, thereby freeing the parachute from the cover, said connecting means also including a link of suitable material, of such length as to interpose an appreciable interval of time between the drawing of the cover from the packed parachute and the beginning of the pulling out of the parachute from its packed position.

4. A parachute pack cover covering a packed parachute, a static line attached to said cover, said static line being adapted to draw said cover from said packed parachute, suitable connecting means attaching said cover to said parachute, said connecting means functioning to pull out said parachute to its greatest normal length when cover is drawn away by means of said static line, said connecting means including a breakable member adapted to be broken when parachute has been pulled out to its greatest normal length, thereby freeing the parachute from the cover, said connecting means also including a link of suitable material of such length as to interpose an appreciable interval of time between the drawing of the cover from the packed parachute and the beginning of the pulling out of the parachute from its packed position, a shield of suitable material and of suitable size attached to said cover, said shield being interposable between said link and said packed parachute and adapted to prevent entanglement of the link with the parachute.

RICHARD H. HART.